United States Patent
Salonen

[11] Patent Number: 5,999,121
[45] Date of Patent: Dec. 7, 1999

[54] RADIOMETER AND WATER INDICATING METHOD

[76] Inventor: Pentti Salonen, Lapuankuja 2, Fin-04430 Järvenpëë, Finland

[21] Appl. No.: 08/930,048
[22] PCT Filed: Mar. 28, 1996
[86] PCT No.: PCT/FI96/00173
 § 371 Date: Sep. 26, 1997
 § 102(e) Date: Sep. 26, 1997
[87] PCT Pub. No.: WO96/30783
 PCT Pub. Date: Oct. 3, 1996

[30] Foreign Application Priority Data

Mar. 28, 1995 [FI] Finland ................................ 951472

[51] Int. Cl.⁶ .................................................. G01R 27/04
[52] U.S. Cl. ..................... 342/351; 73/29.01; 324/640
[58] Field of Search ........................... 324/640; 342/351; 73/29.01

[56] References Cited

U.S. PATENT DOCUMENTS 3,921,169 11/1975 Lazarchik et al. .
4,511,897 4/1985 Lindner .
4,521,861 6/1985 Logan et al. .
4,527,162 7/1985 Strickland ............................... 342/351
4,873,481 10/1989 Nelson et al. .
5,065,615 11/1991 Hill ......................................... 324/640

OTHER PUBLICATIONS

Carlsson, Reidar, "SMHI satsar på ny teknik: Bättre väderprognos med radar och mikrovågo" article, *elteknik med aktuell*, pp. 6–8, 1983.

*Primary Examiner*—Thomas H. Tarcza
*Assistant Examiner*—Devin Drummond
*Attorney, Agent, or Firm*—Knobbe, Martens, Olson & Bear

[57] ABSTRACT

A radiometer and a method for indicating water content and water content change caused by water and/or liquid water are disclosed. According to the method, changes of noise temperature values are observed by receiving microwave electromagnetic radiation at a medium frequency. This medium frequency is considerably below the lowest absorption resonance (approximately 22 GHz) of water molecules. At least one noise temperature value is set as reference value, and noise temperature changes are compared with the reference level.

15 Claims, 7 Drawing Sheets

RADIOMETER AND WATER INDICATING METHOD

FIELD OF THE INVENTION

The objective of the invention is a radiometer and a method for indicating water content, for example, water content change caused by water vapor and/or liquid water.

The radiometer is a sensitive receiver for small power level measurement. The radiometer deviates from a conventional receiver in two ways. Its input signal is phase-incoherent and broadband, which means that it has noise character; in the receivers generally phase-coherent and almost monochromatic. Secondly, conventional receivers require to operate as signal and noise ratio a considerably higher value than one. The actual radiometric 'signal' effect is generally much lower than the receiver's own noise level. The radiometer measures the receiving equipment's system noise temperature, which consists of the antenna noise temperature and the receiver noise temperature. The antenna noise temperature is formed of the noise effect coming via the main beam and the side lobes according to diagram 1.6.

BACKGROUND OF THE INVENTION

The essential atmospheric agents for microwave radiometry are oxygen and water vapor. The atmospheric oxygen and water vapor emit on a cloudless sky thermal noise and provide the so called clear sky radiometric brightness temperature $T_{sky}$. Inspected from the ground, the atmospheric brightness temperature at clear weather is a function of both frequency and elevation. The frequency dependence is due to the resonant absorption/emission spectrum of water and oxygen molecules. Due to the atmospheric pressure the spectral lines are spread on a broader frequency range. The lowest spectral line of the water molecule absorption/emission resonance is at approx. 22 GHz frequency (FIG. 6a). The elevation angle dependence of the clear sky brightness temperature results from geometry. The transmission path length of the layer formed on the ground by the atmosphere is considerably shorter in the zenith direction than closer to the horizon (FIG. 6b). The radiometric brightness temperature of the atmosphere is to a certain extent dependent on the amount of effective agent in the radiometer beam, at clear sky on the so called effective path length of the inspection direction. The clear sky brightness temperature in zenith direction is thus considerably lower than close to the horizon (FIG. 6a).

Water is present in the atmosphere in water vapor and liquid form and as ice in clouds and rains. Atmospheric water content changes: air humidity, clouds and rain occur in the microwave region as changes in the sky brightness temperature.

Atmospheric property observations with a radiometric scanner and rain indication with a rain detector are presented as examples of the fields of embodiment of the method and device according to the invention.

Atmospheric and ground properties have been measured by microwave radiometers both from satellites (weather and remote sensing satellites) and from the ground.

Atmospheric microwave radiometric measurements from the ground have been utilized for example, in meteorological applications, in measurements relating to interferometric and electromagnetic wave propagation studies, e.g.:

i) the U.S. Pat. No. 4,873,481
ii) Measurement of atmospheric water vapor with microwave radiometry; S. Elgered et al./Chalmers University of Technology, Sweden,
iii) Utilization of the radiometry method in a satellite connection propagation study; T. Kokkila, thesis for diploma, University of Technology 1988,
iv) Correction of satellite beacon propagation data using radiometer measurements; Stutzman, Haidara, Reklus, IEEE Proceedings.-Microwaves. Antennas. Propagation, Vol 141 No.1 Feb 1994,
v) Use of radiometers in atmospheric attenuation measurements Allnut, Pratt, Stutzman, Snider IEEE Proceedings.- Microwaves. Antennas. Propagation, Vol 141 No.5 Oct 1994.

The measuring device used in the above references are radiometers of Dicke-type (i, ii, iii) and a total output radiometer (iv, v). The radiometers are multichannel or connected to a measuring system utilizing radiometric measurements was to determine atmospheric properties by brightness temperature absolute values. The measuring of the brightness temperature absolute values requires stabilization of the radiometer amplification, measuring result calibration, accurate knowledge of the antenna side lobe properties and ambient radiation properties. The stabilization of the radiometer amplification is based on the construction principle (Dicke) or on a regular reference load measurement (total output radiometry). Calibration of the measuring results can be implemented by known objects giving hot/cold-brightness temperatures or by artificial loads, for example, by placing before the radiometer antenna input a piece of space cloth having the ambient temperature and alternately a piece of space cloth cooled with e.g. liquid nitrogen. The side lobe properties of the antenna can be estimated by measuring the antenna beam figure at used frequencies. The ambient radiation properties can be estimated by known radiation properties of the ground. Based on this and the above mentioned references, the determination of the atmospheric brightness temperature absolute values requires complicated equipment, 'scientific instruments' as well as difficult and expensive measurement systems.

The atmospheric weather phenomenons can be also observed by a radar. The effect transmitted by the radar scatters from the water drops thus revealing possible water containing objects. Use of the radar requires a transmitter/receiver equipment. The curvature of the ground causes a shadow region, which restricts the operation range of the radar. The currently used rain indicating detectors are based on the observation of some electric property change in the detector component caused by the rain (rain drops or snow flakes), for example, the capacitance or breakdown voltage. The mechanical constructions of these detectors are due to their operation principle open and therefore sensitive to malfunctions caused by fouling and require regular service.

One rain detector application area is the automatic control of, for example the heating systems of satellite earth station antenna reflectors. The wet snow gathered on the earth station antenna surfaces attenuates the signal and turns the antenna beam away from the satellite direction thus reducing the capacity of the antenna. The rain detectors function in connection with outdoor temperature detectors, controlling the reflector heating into function when it rains at the temperature area of approx. −5°−+5° C. At higher temperatures the reflector snow melts by itself and at lower temperatures there is the risk that the melted snow freezes to the antenna constructions. Dry frozen snow has also a smaller effect than wet snow.

In addition to the above mentioned mechanical construction disadvantages, the present rain detectors in the satellite earth station heating control system have the deficiency that they in certain conditions do not observe the problems caused by snow gathered on the antenna surface. Frozen snowfall (for example, 10° C.) and its gathering on the reflector surface does not switch on the heating control system. The warming of the gathered frozen snow when the weather becomes warmer or the sun has warmed the reflector surface increases the liquid water content of the snow. The melting of the gathered frozen snow on the antenna surface might cause long breaks or quality deteriorations in the telecommunication for several days after the snowing.

SUMMARY OF THE INVENTION

The method and device according to the invention provide observations of water content changes with a simple microwave total output radiometer, the medium frequency of which is considerably below the lowest absorption resonance frequency (22,3 GHz) of the water molecule. The invention enables the observation of, for example the presence of atmospheric clouds and rain cells and provides information about their properties in a new way.

The method, equipment and applications presented are based on utilization of the relative and/or differential measurement results of the antenna noise temperatures. The measurement method creates conditions in which the phenomenon observed causes the brightness temperature change seen by the radiometer. The radiometer antenna beam is directed in the direction giving the basic brightness temperature level, for example radiometricly to the "cold" sky. The appearance of water in the antenna beam causes the radiometer to see the brightness temperature change. The antenna beam can be directed straight in a direction giving the basic level or via the conducing surface. The basic level object can also be, for example a frozen space cloth or a radiometric hot piece.

The invention provides a new solution which eliminates the disadvantages of the above described atmospheric observation methods and rain detectors. The invention is characterized in what is presented in the claims below.

The devices according to the invention monitor the radiometer antenna noise temperature changes. The side lobe or ambient noise radiation properties need not to be known, as these are not required for the measurement results. The measuring principle is relative and/or differential forming the reference level of some of the measuring results. The reference level floats, which means that it conforms to the slow changes of the noise radiation properties. At the frequency band used, water causes a noticeable change in the atmospheric brightness temperature, but no particular disadvantages when gathered in the equipment constructions.

Separate reference loads as stabilization references or absolute value calibrations are not used, thus avoiding the complicated and expensive construction of radiometers of Dicke-type as well as the inconvenient periodic stabilization of the total output radiometers and the absolute value calibration of both radiometer-types.

The simple radiometer used in the method can to its main parts be assembled of conventional components. The device parameters have been chosen to provide a high radiometric sensitivity (smallest expressible noise temperature difference) and a big dynamic range for water indication at the applicable frequency band. The method according to the invention provides new means of obtaining information about the properties of atmosphere, clouds and rain cells.

According to one form of embodiment the solution of the invention can be used at satellite earth stations to improve the heating system control of the antenna reflectors, thus also improving the quality of the satellite connection.

BRIEF DESCRIPTION OF THE DRAWINGS

The invention is described with reference to the enclosed drawings, in which.

DETAILED DESCRIPTION OF THE INVENTION

Figure 1:
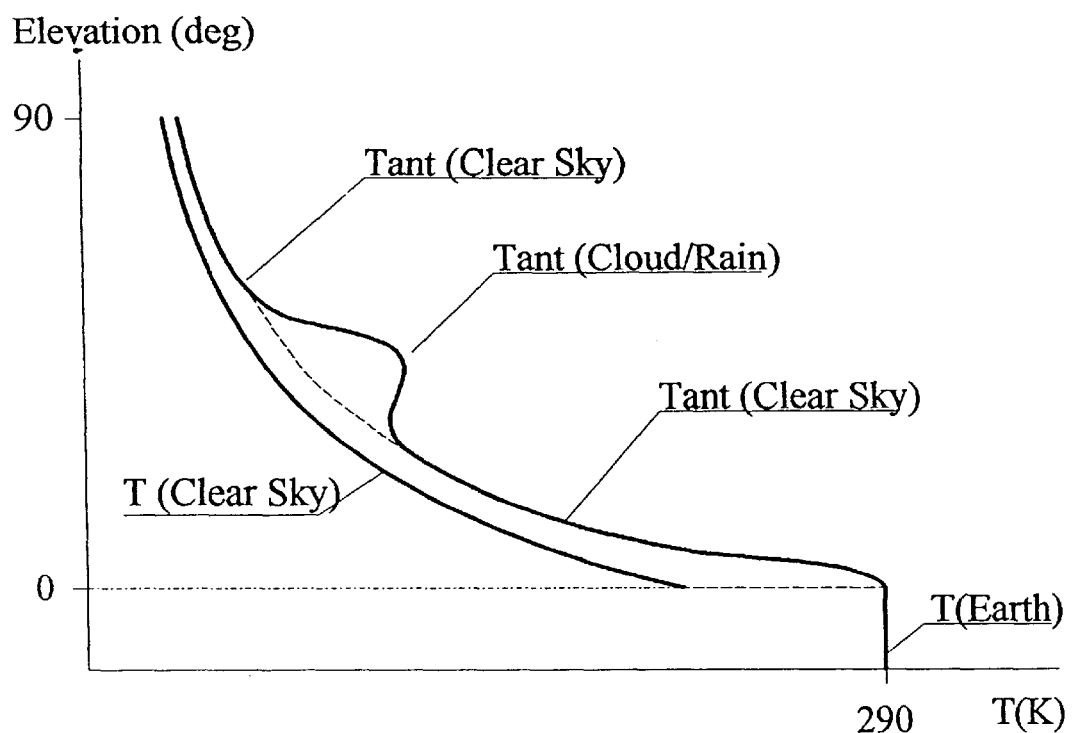
FIG. 1 shows a basic diagram of the clear sky and ground brightness temperature and the antenna noise temperature as a function of elevation at a frequency considerably below 22 GHz.

FIG. 1 presents the clear sky and ground brightness temperature and the antenna noise temperature as a function of elevation at a frequency considerably below 22 GHz. The clear sky brightness temperature rises from a few Kelvin in zenith (elevation 90°) to over one hundred Kelvin on the horizon (0°). The brightness temperature of the ground is about 290 K. When the antenna is directed to zenith, the antenna noise temperature is formed of the visible brightness temperature from the main beam direction and also partly of the higher brightness temperatures visible from the side lobe and the back lobe directions. The noise temperature of the antenna becomes thus higher than the sky brightness temperature visible in the main beam direction. The antenna noise temperature at small elevation angles rises quickly when the more powerful side lobes and the main beam are directed towards the ground. If there is a cloud or a rain cell in the main beam direction, the antenna noise temperature rises compared to the clear sky antenna noise temperature at this elevation. In FIG. 1 the curve $T_{(ClearSky)}$ illustrates the clear sky brightness temperature in relation to the elevation angle. $T_{Ant}$ illustrates the antenna noise temperature. $T_{Ant\ (ClearSky)}$ illustrates the noise temperature at clear sky. $T_{Ant\ (Cloud/Rain)}$ illustrates the antenna noise temperature when the radiometer receives thermal noise from a cloud or rain cell. As reference level is presented in dashed line the curve portion illustrating the antenna noise temperature caused by the clear sky. $T_{(Earth)}$ illustrates the brightness temperature of the ground.

Figure 2A:
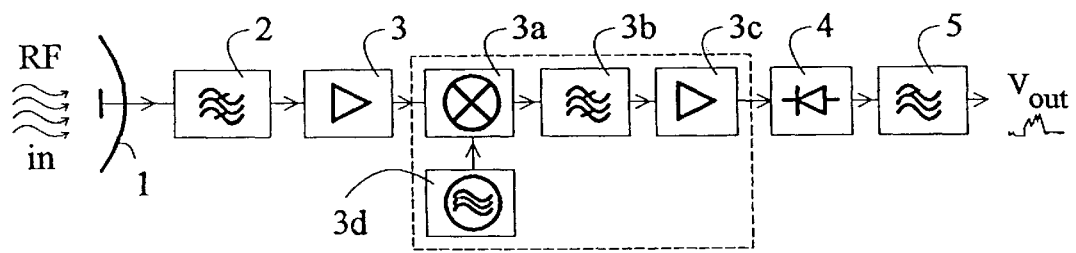
FIG. 2a presents a block diagram of the total output radiometer principle.
Figure 2B:
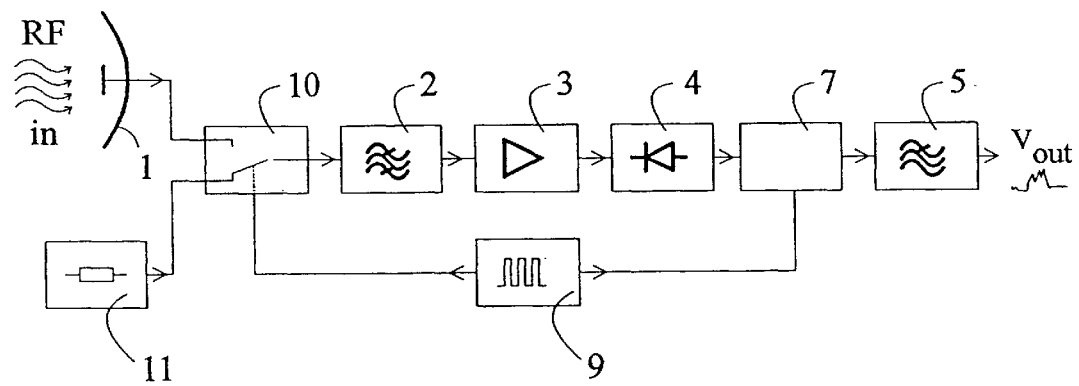
FIG. 2b presents a block diagram of the Dicke-radiometer principle.

FIG. 2 shows a principle block diagram of the total output radiometer. The noise effect RF coming via the antenna 1 is limited in the band filter 2 and transmitted via the amplifier 3 to the detector 4. Essentially the same total output radiometric function is alternatively obtained with the superheterodyne-principle. In this the output of the preamplifier 3 is led to the mixer 3a, from the output of which is band-filtered with 3b an intermediate frequency signal, which is further amplified in the intermediate frequency amplifier 3c and transmitted to the detector 4. The intermediate frequency is formed of the difference between the RF-frequency and the local oscillator 3d frequency. The signal received after the detector is low pass filtered in 5. The output provides a voltage $V_{out}$, which is proportional to the noise effect coming to the detector, which voltage contains a direct voltage component $V_{DC}$ and an alternating voltage $V_{AC}$.

$$V_{out} = V_{DC} + V_{AC} \tag{1.1}$$

In the ideal case, the radiometer sensitivity, the smallest expressible noise temperature difference $\Delta T$ is directly proportional to the system noise temperature $T_{SYS}$ and inversely proportional to the square root of the radiometer bandwidth B and the low pass filter integration time $\tau$:

$$\Delta T = T_{SYS} \cdot \frac{1}{\sqrt{B\tau}} \tag{1.2}$$

The system noise temperature is formed of the antenna noise $T_A$ which is the antenna noise temperature $T_{Ant}$, and the radiometric receiver noise $T_R$.

$$T_{SYS} = T_A + T_R. \tag{1.3}$$

The amplification variation $\Delta G_S$ occurring in the radiometers in practice weakens the radiometric sensitivity:

$$\Delta T = T_{SYS}\sqrt{1/B\tau + (\Delta G_s/G_s)^2} \tag{1.4}$$

in which $G_s$ is the radiometric total amplification.

The sensitivity of the total output radiometer is defined according to formula 1.4. In Dicke-radiometers (FIG. 2b) the sensitivity weakening caused by amplification variations is prevented by calibrating the radiometer with the switch 10 to a reference load 11 caused by a known noise temperature. The operation of the switch 10 and the phase detector 7 are controlled by the oscillator 9, having typically a frequency in the range of hundreds of hertz.

The sensitivity achieved with the Dicke-radiometer (lowest measurable noise temperature difference) is:

$$\Delta T = 2T_{SYS} \cdot \frac{1}{\sqrt{B\tau}} \tag{1.5}$$

i.e., two times inferior to the one of the total output radiometer.

The microwave radiometer is often furnished either with a horn or reflector antenna. The (virtual) radiometric brightness temperature $T_{AP}$ visible from the ambience in the radiometer antenna is direction-dependent $T_{AP}(\theta, \Theta)$. The noise temperature $T_A$ of the radiometer antenna is formed of the brightness temperature $T_{AP}((\theta, \Theta)$ weighted with the antenna beam figure $$P_N(\theta, \Theta).$$

$$T_A = \frac{\int\int \Delta \pi T_{AP}(\theta, \phi) P_N(\theta, \phi) d\Omega}{\int\int_{4\pi} P_N(\theta, \phi) d\Omega} \tag{1.6}$$

Figure 3A:
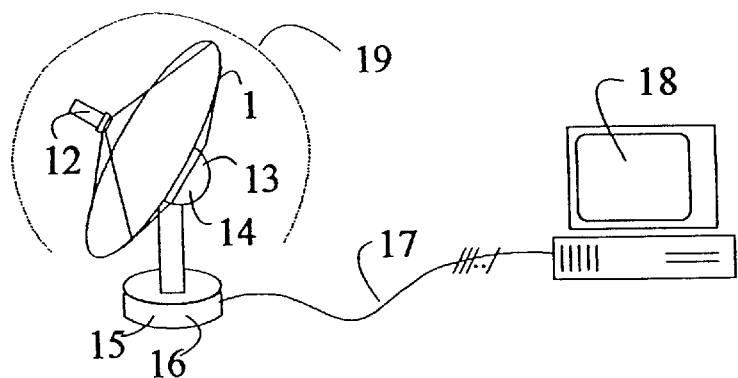
FIG. 3a presents an equipment for the radiometric scanner application.

One application of the method and the total output radiometer adapted thereto is the radiometric scanner (FIG. 3a). It comprises the antenna 1, the radiometric receiver 12, the antenna elevation drive 13, the elevation angle detector 14, the antenna azimuth drive 15, the azimuth angle detector 16, the cabling 17 and the control/data processing unit 18 with the display unit. The scanner antenna can be placed inside the radome 19. The radiometric scanner observes the atmosphere from the ground (ground based radiometer) and is placed so that the visibility to the horizon is as unobstructed as possible.

Figure 3B:
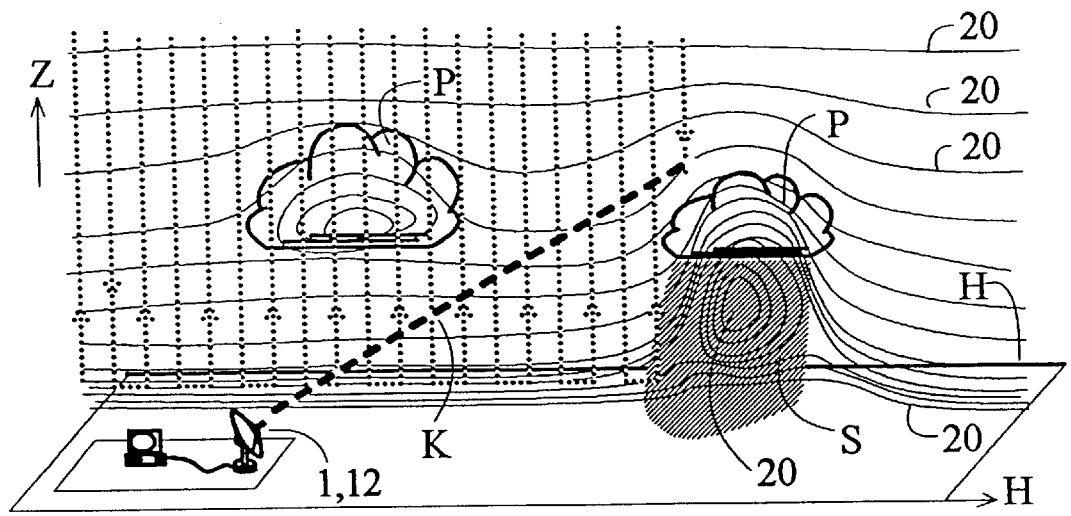
FIG. 3b shows the radiometric scanner operating principle.

The scanner (FIG. 3b) antenna 1 is turned in the elevation and azimuth angles so that the main beam K scans the elevation angle below the horizon H towards zenith Z. The path is illustrated by dotted lines. When the elevation scanning is finished, the azimuth angle is turned and a new elevation scanning is started, thus covering the hole elevation-azimuth-angle-area to be scanned. The solid curves 20 illustrate the curves of the same brightness temperature. In the cloud P and the rain S the curves indicate their higher brightness temperatures in relation to the rest of the ambience.

Figure 3C:
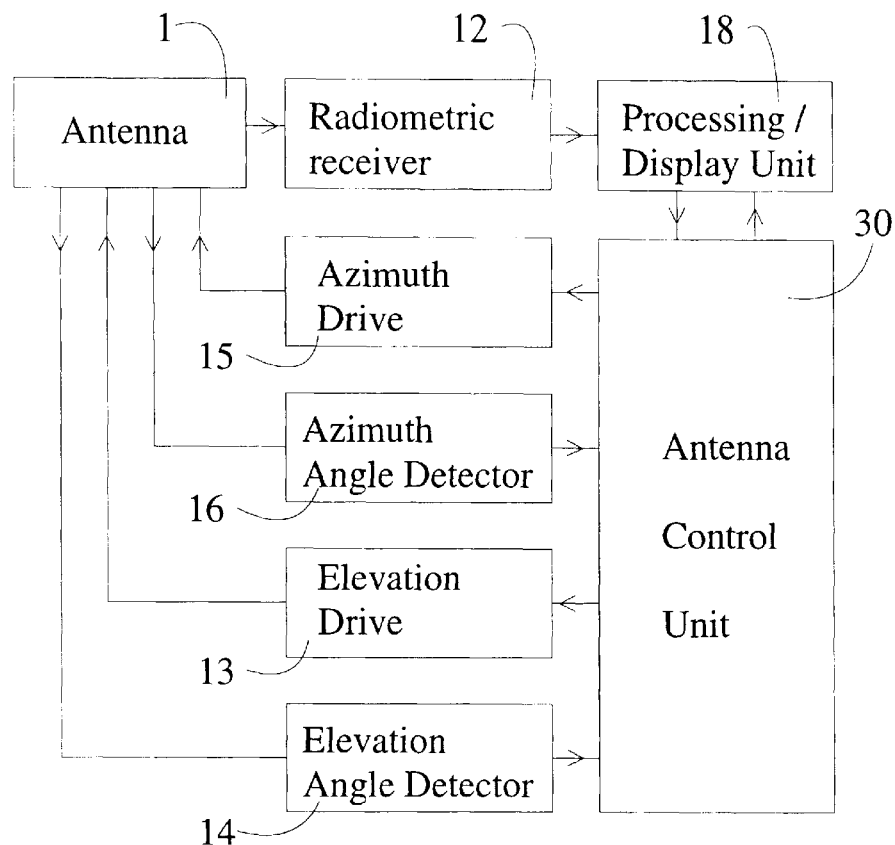
FIG. 3c shows a functional block diagram of the radiometric scanner.

FIG. 3c presents an operational block diagram of the radiometric scanner. The radiometric receiver 12 obtains a received noise effect from the antenna 1. The receiver output is connected to the data processing/processing/display unit 18, which also controls the azimuth drive 15 and the elevation drive 13 through the antenna control unit 30. The data processing/processing/display unit 18 receives the antenna position data from the azimuth angle detector 16 and the elevation angle detector 14 through the antenna control unit.

During operation the voltage $V_{out}$ value obtained from the radiometer output is recorded as a function of the azimuth and elevation angle and the time $V_{out}(Az,El,t)$. The voltage is proportional to the system noise temperature $T_{SYS}(Az,El,t)$. When the radiometric receiver's own noise temperature $T_R$ is known, the radiometric antenna noise temperature $T_A$ can be calculated $$T_A(Az,El,t) = T_{SYS}(Az,El,t) - T_R.$$

At clear sky in the elevation scanning area, the radiometric antenna noise temperature changes as a function of the elevation angle starting at zenith from smaller to bigger $T_{A\ ClearSky}(El)$. When the antenna main beam is below the horizon, the antenna brightness temperature is close to the physical temperature of the ground $T_{A\ Ground}$. The magnitude of the antenna noise temperature caused by the clear sky in zenith $T_{A\ Zenith}$ and to what level it rises when approaching the horizon, depend on the medium frequency of the radiometric receiver and on the antenna side lobe properties. The antenna noise temperature is formed of the combined effects of ambience and the antenna properties (formula 1.6). The antenna noise temperature of a radiometer monitoring the atmosphere from the ground in clear sky conditions is due to horizon level and variations in ground radiation properties dependent on the antenna elevation angle and also on the azimuth angle.

The antenna noise temperature graph $T_{A\ ClearSky}(Az,El)$ obtained in clear sky conditions forms the basic reference of the scanning result analysis.

If, during elevation scanning the antenna beam hits a water containing object, for example a cloud or a rain cell, the radiometer antenna noise temperature $T_A(Az,El,t)$ rises compared to when the beam hits a clear sky area at the same azimuth or elevation value. The increase in the antenna noise temperature is bigger the more water is present in the main beam area when penetrating the atmosphere.

Figure 4:
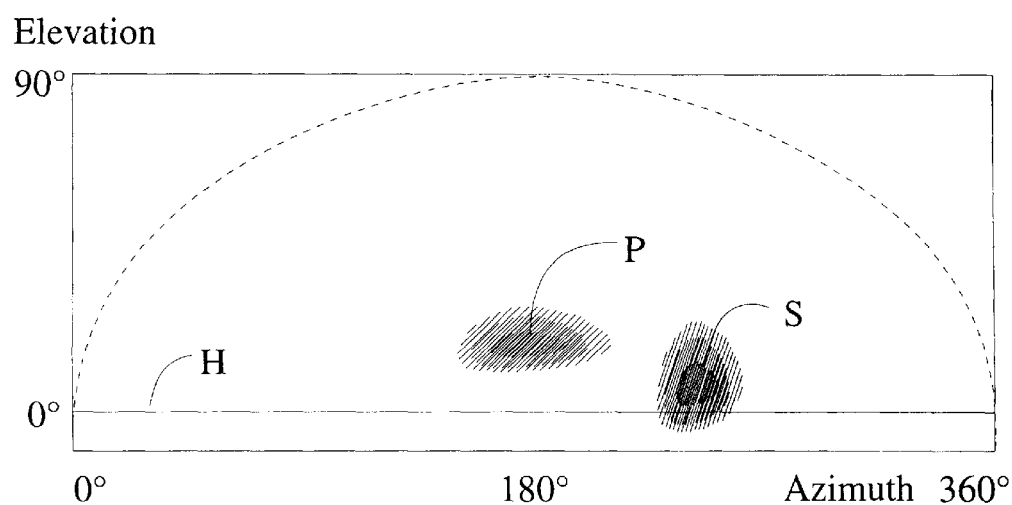
FIG. 4 shows a plane diagram output of the radiometric scanner.

The results can, for example be presented as a plane diagram (FIG. 4) using the clear sky scanning antenna noise temperature curve $T_{A\ ClearSky}(Az,El)$ as reference level and by producing an output from the scanned area of the noise temperature difference $T_{A\ Diff}(Az,El,t)$ observed by the radiometer antenna as a function of time $$T_{A\ Diff}(Az,El,t)=T_A(Az,El,t)-T_{A\ ClearSky}(Az,El).$$

The plane diagram changing by time provides antenna noise temperatures which deviate from the clear sky conditions, caused merely by water at the microwave region 10 . . . 30 GHz. The deviations illustrate either rain S or cloud P, that is, weather changes in relation to clear sky. Sun is a strong noise source clearly visible in the radiometer antenna noise temperature even at beam widths over ten degrees. The time and place for the presence of the sun are predictable and can if so desired be excluded from the output.

When the antenna main beam width is about one degree or more, the moon, the solar system planets, radio galaxies and other spatial radio sources cause an insignificant change in the antenna noise temperature. The cosmic background noise is independent of direction and does thus not affect the relative values; it is contained in the basic reference.

Strong radio transmitters at the frequency used by the radiometer, and in visual communication with it, appear as dotted noise sources. If their location is known, they can be excluded from the output.

Outdoor measurement provides a better knowledge of the ground brightness temperature thus enabling the calibration of the measuring results and the clear sky reference level at an absolute scale. At big elevations (>30° C.) the rain-fall (mm/h) can be estimated based on known properties and the above mentioned calibration data. The effective path length of rain as function of elevation at different rain forces are known. When the rain cell brightness temperature and the measurement elevation angle are known, an estimate can be calculated for the rain force of the rain cell in question.

Figure 5A:
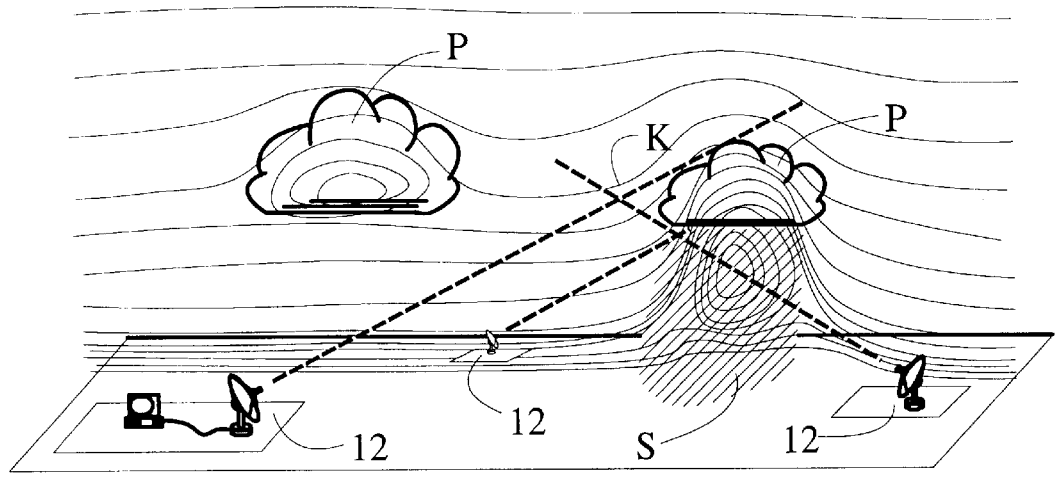
FIG. 5a shows the principle of the radiometric scanner network.
Figure 5B:
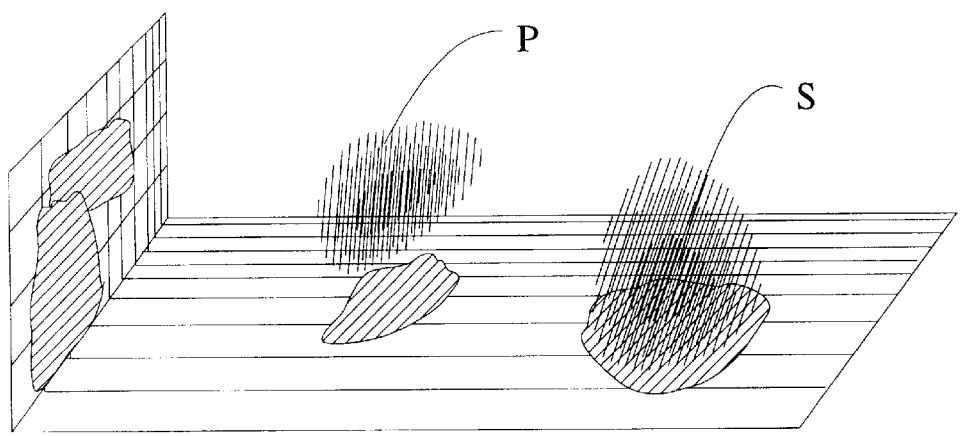
FIG. 5b shows the principle of the radiometric scanner network combined output.

The radiometric scanners can be linked into operational networks (FIG. 5a). When the locations of the scanners in relation to each other are known, the objects causing atmospheric brightness temperature changes can be spatially delimited using the antenna noise temperature data gathered. With the output figure (FIG. 5b) the location, shape, structure and movement of the clouds and rain cells can be observed more in detail than with one scanner.

The radiometric scanner parameters, namely antenna noise temperature, medium frequency, bandwidth, integration time and sensitivity matching are below presented using examples. The sensitivity of the radiometric receiver has to be sufficient to observe weak objects, for example to distinguish a thin cloud at a short effective path, in the zenith direction.

A cloud penetrated by the radiometer beam at the length of 1 km (effective path length) and which contains water 1 g/m$^3$, causes a brightness temperature change of approx. 0,7 K at 12 GHz frequency when received by the radiometer antenna. For the mentioned cloud to cause a measurable change in the radiometer system noise temperature, the sensitivity of the radiometer has to be 0,2 K or more. For example, with radio parameters such as: bandwidth 500 MHz, integration time 4 ms, amplification variation 5×10$^{-4}$ and system noise temperature 200 K, a sensitivity of 0,17 K is obtained.

Figure 6A:
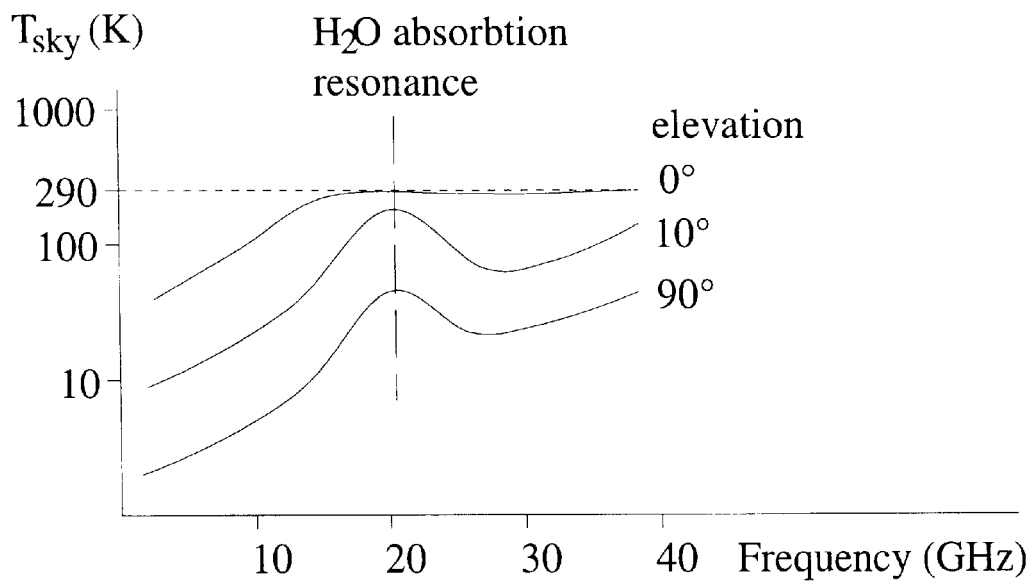
FIG. 6a presents the clear sky brightness temperature as a function of the frequency at different elevation angles.
Figure 6B:
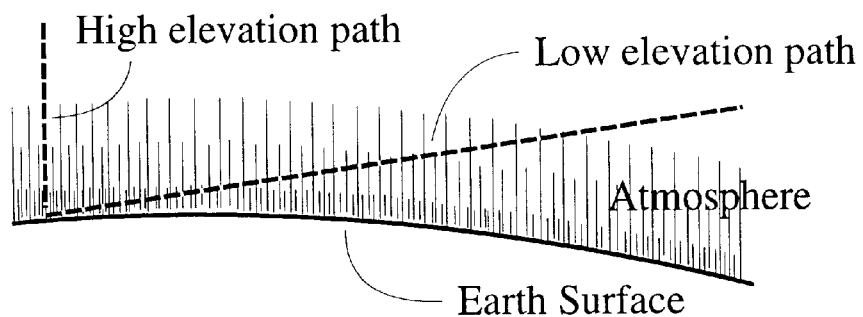
FIG. 6b presents the length of the atmospheric penetration path in zenith and close to the horizon.

The clear sky noise temperature of the antenna should also at small elevation angles be considerably below the physical temperature of the atmospheric water (approx. 290 K), to provide a large scanner range. The antenna noise temperature depends on the elevation angle, the radiometer frequency and the antenna side lobe properties. At the absorption resonance spectral peak frequency of the water molecule (22.3 GHz) and an elevation angle of 0° (FIG. 6a), the clear sky brightness temperature is 290 K at an absolute humidity of 7,5 g/m$^3$. As the brightness temperatures caused by clouds and rain cells are at maximum close to the physical temperature (approx. 290 K) of rain, the change caused by the rain in the sky brightness temperature cannot be observed at 22 GHz frequency at 0°-elevation.

A rain cell with a diameter (effective path length) of 3 km and a rainfall of 25 mm/h causes an increase in the clear sky brightness temperature of approx. 100 K at 10 GHz and approx. 190 K at 15 GHz frequency. The observation of this from the horizon by its whole dynamics requires a sky brightness temperature of below 190 K (10 GHz) or below 100 K (15 GHz).

On the horizon the clear sky brightness temperature at 10 GHz is approx. 130 K (<190 K) and at 15 GHz approx. 200 K (>100 K). Iteration gives with a 100 K dynamic requirement a scanner upper frequency limit of approx. 12.5 GHz on the horizon.

Due to the earth curvature distant low objects stay beyond the horizon; objects visible on the horizon level from a distance of 100 km are approx. 800 m above the ground. As water containing clouds and rains occur at a height of 0 . . . 4 km, part of the objects remains beyond the horizon at distances over 100 km. A 4 km high rain cell at a distance of 100 km is visible at the 0°–1.8° elevation.

The sky brightness temperature at one degree elevation is several Kelvins lower than on the horizon. On the other hand, due to side lobe properties the antenna noise temperature is several tens of Kelvins higher than the sky brightness temperature at the same elevation, provided that the antenna main beam is fully above the horizon. The dynamic requirements cause the facts presented above to cancel each other out. Variation in the absolute humidity of air from 'normal' 7.5 g/m$^3$ can change the sky brightness temperature several tens of Kelvins. This is seen as the dynamic area variation.

The inspection above provides an upper limit for the radiometric scanner frequency of 12.5 GHz at a linear range of 100 km. The radiometer frequency range should provide the biggest possible change area (dynamics) due to atmospheric water quantity changes. When moving from the scanner upper frequency limits to lower frequencies, the dynamic range is restricted by the sensitivity relation of the radiometer to the small sky brightness temperature increase caused by weak objects. The frequency band used by the radiometric scanner should therefore be close to the upper frequency limit, between 11–12.5 GHz.

The radiometer integration time has to be short in order to provide a sufficient angular speed of the scanner to produce a dynamic brightness temperature picture. Assuming that the scanner produces an output of the firmament four times an hour in order to obtain a realtime-picture, the elevation scanning speed has to be approx. 20°. . . 50° per second at the beam width of two degrees, depending on the azimuth transition between the elevation scannings. At a speed of 50° per second the beam moves two degrees in 40 ms. If the beam width is also in the range of 2°, the integration time must be considerably shorter than the transition time in the range of approx. 4 ms.

The antenna beam width should be as small as possible, in order to obtain a resolution and a small minimum elevation angle. The antenna beam width is inversely proportional to the diameter of the antenna. The bigger antenna, the narrower beam, the better resolution and smaller minimum elevation angle (prior to the main beam hitting the ground). If, on the other hand, the firmament scanning is to be made with a narrow-beam antenna in the same time as with a wide-beam antenna, the angular speed has to be increased. The angular speed increase leads to a shortening of the integration time causing a weakening in the radiometer sensitivity.

In order to achieve a quick picture update of the atmospheric cloud and rain cell changes and in relation to the scanner range to observe weak objects with a sufficient sensitivity, a minimum limit-value of the antenna beam width of approx. 2° is obtained, which corresponds to an antenna diameter of 1 m at 12 GHz frequency.

The observation of a rain cell having a diameter of 3 km at a distance of 100 km at full dynamics requires the filling of the antenna beam with the object in question. This is realized at 12 GHz with an antenna having a diameter of approx. 1 m.

The frequency band used by the radiometer should be free of strong radio transmissions. The frequency band 11.00–12.75 GHz is generally reserved for the downlink of geostationary satellites. These signals have a weak effect and the locations of the transmitters can be identified.

Local weather condition, namely the occurrence of clouds and rain cells, their movements and changes can, for example, be observed with the device and method according to the invention (a radiometric scanner). The location of the clouds and the rain cells and a more accurate definition of their shapes is obtained with a network formed of several scanners. This almost realtime and locally accurate weather condition information can be utilized in addition to weather forecasts, for example in agriculture, hydrology, pollution fallout location, traffic (air, land, sea) and in electromagnetic transmission attenuation forecasts (links and satellites).

Figure 7:
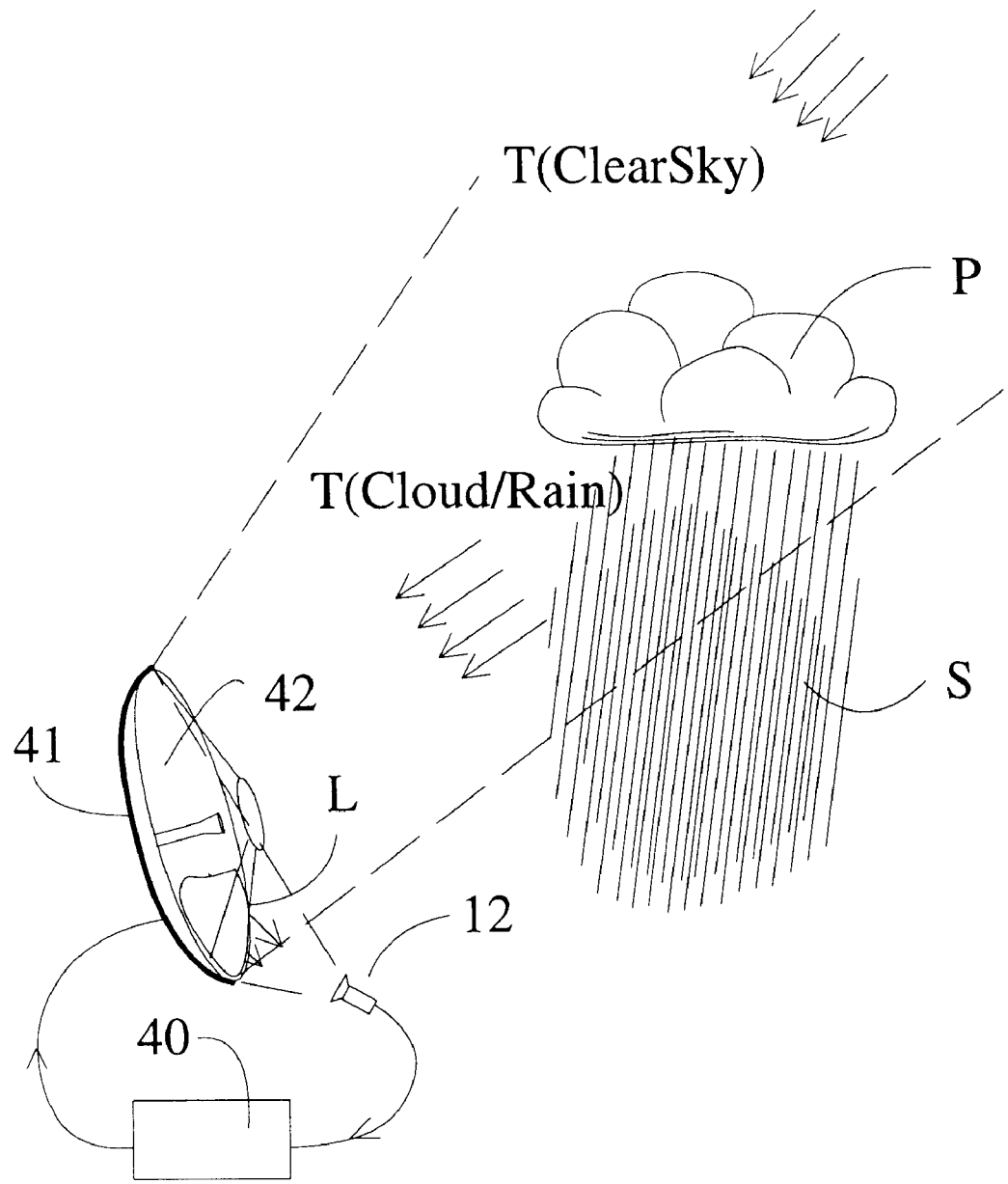
FIG. 7 shows a snow-/rain detector application of a satellite earth station heating system.

One embodiment of the method according to the invention and the total output radiometer adapted thereto is the rain detector. The heating system 40 control of the satellite earth station antenna 41 is one example of the detector operation (FIG. 7).

A radiometer 12 furnished with a horn antenna is placed so that the radiometer antenna beam reflects from the earth station antenna 41 reflector 42 to the sky. In clear sky conditions the radiometer antenna noise temperature is $T_{Ant(ClearSky)}$.

If the radiometer antenna at the sky hits a cloud P or rain cell S or if wet snow L has gathered on the antenna surface, these cause an increase in the radiometer antenna noise temperature $T_{Ant(Rain)}$ in relation to clear sky condition. When the difference $$T_{Ant(Diff)} = T_{Ant(Rain)} - T_{Ant(ClearSky)}$$

exceeds the set threshold value $T_{Ant(Threshold)}$, the heating system is controlled into operation. The method is for the satellite earth station operation a direct measurement of the increase in the received signal noise level and the attenuation of the receiving and transmission properties of the antenna caused by rain and snow gathered on the antenna surface. The radiometer beam width is in this application in the category of ten or tens of degrees. Due to fixed alignment and the slow change rate of the observed phenomenon, the integration time can be several seconds. In order to be insensible to fouling and moisture gathered on the detector surface, its frequency should be low. On the other hand in order to have a sufficient sensitivity for observing water the frequency and band used should be high.

These mentioned conditions result in operational frequency limits of 10–13 GHz.

The detector according to the invention can also be used so that the radiometer main beam sees the object giving the reference level directly or via the conductive surface. The liquid substance or object moving to or gathered in the radiometer beam region causes the radiometric antenna noise temperature change.

What is claimed is:

1. A method for indicating water content change through observing noise temperature changes, comprising the steps of:
   receiving continuously electromagnetic microwave radiation with a receiver at a medium frequency below a lowest absorption resonance of water molecules;
   setting at least one noise temperature value as a reference level; and
   comparing the noise temperature changes with the reference level.

2. The method according to claim 1, further comprising the step of:
   generating output signals as responses to the received radiation at said medium frequency, said output signals representing the noise temperature values of an antenna of the receiver at certain elevation and azimuth angles.

3. The method according to claim 2, further comprising the step of:
   sweeping different elevation and azimuth angles with a virtual beam in a main axis of the antenna, the noise temperature values changing with respect to the reference value determined in clear sky conditions along with the moving of the antenna.

4. The method according to claim 3, further comprising the steps of:
   controlling the antenna with an antenna control unit, said control unit receiving signals from a data processing/display unit which receives antenna signals from a radiometer;
   transmitting signals to said data processing/display unit;
   transmitting an azimuth control signal to an azimuth drive for controlling the antenna;
   receiving an azimuth angle signal from an azimuth angle detector;
   transmitting an elevation control signal to an elevation drive for controlling the antenna; and
   receiving an elevation angle signal from an elevation angle detector.

5. The method according to claim 4, further comprising the step of:
   forming a network of antennas and radiometers by positioning them spaced apart so that same atmospheric regions are scanned by more than one antenna in at least some areas.

6. The method according to claim 1, further comprising the steps of:
   receiving a high frequency noise signal and mixing it with a local oscillator signal resulting in a lower, medium frequency noise signal;

limiting the bandwidth of the medium frequency noise signal by means of a band filter;

amplifying, indicating and integrating the medium frequency noise signal to determine an antenna noise temperature value of the radiometer at a microwave frequency region;

comparing said antenna noise temperature value with an antenna noise temperature value obtained in clear sky conditions; and presenting weather information derived from changes of the noise temperature value with respect to the reference level.

7. The method according to claim 6, further comprising the step of:

mixing the high frequency noise signal with the local oscillator signal resulting in medium frequency noise signal having a frequency of 10 to 15 GHz, with the antenna noise temperature value being below 290 K at elevation angles smaller than 5°.

8. The method according to claim 7, wherein the intermediate frequency noise signal has a frequency of 11 to 13 GHz.

9. The method according to claim 8, wherein the medium frequency noise signal has a frequency of 11 to 12.75 GHz.

10. The method according to claim 5, further comprising the step of:

directing the antenna of the radiometer straight in a direction providing the reference level for the noise temperature value.

11. The method according to claim 5, further comprising the step of:

directing the antenna of the radiometer via a conducting surface in a direction providing the reference level for the noise temperature value.

12. The method according to claim 11, wherein the conductive surface is the antenna, comprising the further steps of connecting a heating device to the antenna and heating the antenna based on a receipt of predetermined control signals from the radiometer.

13. The method according to claim 1, wherein the frequency is lower than 22 GHz.

14. The method according to claim 13, wherein the frequency is considerably lower than 22 GHz.

15. An apparatus for indicating water content change, comprising:

an antenna configured to receive a noise signal;

a band filter connected to the antenna, the band filter limiting a bandwidth of the noise signal;

an amplifier configured to amplify the bandlimited noise signal;

a detector coupled to an output of the amplifier;

a low pass filter coupled to the detector and configured to filter the noise signal received from the detector; and an output providing a voltage which is proportional to the noise signal input to the detector.

* * * * *

UNITED STATES PATENT AND TRADEMARK OFFICE
CERTIFICATE OF CORRECTION

PATENT NO.   : 5,999,121
DATED        : December 7, 1999
INVENTOR(S)  : Pentti Salonen It is certified that error appears in the above-identified patent and that said Letters Patent is hereby corrected as shown below:

<u>Column 11,</u>
Lines 8-9, please change "intermediate" to -- medium --.

<u>Column 12,</u>
Line 8, please change "steps of" to -- step of --.

Signed and Sealed this

Eighth Day of July, 2003

JAMES E. ROGAN
*Director of the United States Patent and Trademark Office*